United States Patent
Li et al.

(10) Patent No.: US 12,190,557 B2
(45) Date of Patent: Jan. 7, 2025

(54) DIFFERENCE DESCRIPTION STATEMENT GENERATION METHOD AND APPARATUS, DEVICE AND MEDIUM

(71) Applicant: Suzhou Metabrain Intelligent Technology Co., Ltd., Suzhou (CN)

(72) Inventors: Xiaochuan Li, Suzhou (CN); Rengang Li, Suzhou (CN); Zhenhua Guo, Suzhou (CN); Yaqian Zhao, Suzhou (CN); Baoyu Fan, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/714,928

(22) PCT Filed: Sep. 15, 2022

(86) PCT No.: PCT/CN2022/118852
§ 371 (c)(1),
(2) Date: May 30, 2024

(87) PCT Pub. No.: WO2023/201975
PCT Pub. Date: Oct. 26, 2023

(65) Prior Publication Data
US 2024/0331345 A1   Oct. 3, 2024

(30) Foreign Application Priority Data
Apr. 19, 2022   (CN) .......... 202210407134.X

(51) Int. Cl.
 G06V 10/46   (2022.01)
 G06N 3/045   (2023.01)
 G06V 30/418  (2022.01)

(52) U.S. Cl.
 CPC .......... *G06V 10/467* (2022.01); *G06N 3/045* (2023.01); *G06V 30/418* (2022.01)

(58) Field of Classification Search
 CPC ..... G06V 10/467; G06V 30/418; G06N 3/045
 See application file for complete search history.

(56) References Cited

U.S. PATENT DOCUMENTS

2021/0303921 A1*  9/2021  Niu .................. G06V 10/7747
2022/0092683 A1   3/2022  Kochura et al.
(Continued)

FOREIGN PATENT DOCUMENTS

CN   113159095 A   7/2021
CN   113535999 A   10/2021
(Continued)

OTHER PUBLICATIONS

International Search Report and Written Opinion of International Searching Authority of corresponding PCT application (PCT/CN2022/118852) Jan. 6, 2023 including English translation (15 pages).
(Continued)

*Primary Examiner* — Fayyaz Alam
(74) *Attorney, Agent, or Firm* — Crowell & Moring LLP

(57) ABSTRACT

A difference description statement generation method includes: performing feature concatenation on an image encoding feature and a text encoding feature; inputting a concatenated encoding feature to a preset image-text alignment unit constructed based on a preset self-attention mechanism to obtain a concatenated alignment feature; processing, by using a preset noise monitoring unit constructed based on the preset self-attention mechanism and a preset cross-attention mechanism, the text encoding feature, and an image alignment feature and a text alignment feature that are obtained by splitting the concatenated alignment feature respectively, to extract a difference signal; and
(Continued)

generating a difference description statement based on the difference signal by using a preset difference description generation algorithm.

20 Claims, 9 Drawing Sheets

(56) References Cited

U.S. PATENT DOCUMENTS

2022/0383048 A1* 12/2022 Fei .................. G06V 10/82
2023/0237773 A1* 7/2023 Li .................. G06F 40/126
382/155

FOREIGN PATENT DOCUMENTS

| CN | 113837102 A | 12/2021 |
| CN | 114329034 A | 4/2022 |
| CN | 114511860 A | 5/2022 |
| JP | 2005-252527 A | 9/2005 |

OTHER PUBLICATIONS

Search report of corresponding CN priority application (CN202210407134.X) May 18, 2022 (2 pages).
Notification to Grant Patent Right for Invention of corresponding CN priority application (CN202210407134.X) May 25, 2022 including English translation (3 pages).

* cited by examiner

DIFFERENCE DESCRIPTION STATEMENT GENERATION METHOD AND APPARATUS, DEVICE AND MEDIUM

This application is the national phase application of International Patent Application No. PCT/CN2022/118852, filed Sep. 15, 2022, which claims priority to Chinese Patent Application No. 202210407134.X, filed with the China National intellectual Property Administration on Apr. 19, 2022 and entitled "DIFFERENCE DESCRIPTION STATEMENT GENERATION METHOD AND APPARATUS, DEVICE, AND MEDIUM". The contents of International Patent Application No. PCT/CN2022/118852 and Chinese Patent Application No. 202210407134.X are each incorporated by reference in their entireties.

FIELD

The present application relates to the field of artificial intelligence technologies, and in particular, to a difference description statement generation method and apparatus, a device, and a medium.

BACKGROUND

In recent years, multi-modality has become an emerging research direction in the field of artificial intelligence. For example, fields such as visual commonsense reasoning (VCR) and visual question answering (VQA) have become key research directions in the industry. In the field of multi-modality, current subjects are all based on such an assumption that human language is absolutely correct in a multi-modal process, that is, human language is bound to match an image. However, the inventor realizes that for a person, slips of the tongue are inevitable. Although a human language error is generally not very outrageous, that is, text and the image are close, incorrect use of a certain subject or attributive may make a computer model confuse a problem that the person really wants to describe. In this case, it is very necessary to enable a computer to interact pertinently with the person.

Therefore, avoiding an incapability of the computer in normal reasoning due to the human language error and enhancing human-computer interaction experience are urgent problems to be solved in this art.

SUMMARY

According to a first aspect, the present application discloses a difference description statement generation method, including:

encoding a target image and target text respectively, and performing feature concatenation on an image encoding feature and a text encoding feature that are obtained by encoding, to obtain a concatenated encoding feature;

inputting the concatenated encoding feature to a preset image-text alignment unit constructed based on a preset self-attention mechanism to perform image-text alignment processing, to obtain a concatenated alignment feature;

splitting the concatenated alignment feature to obtain an image alignment feature and a text alignment feature, and inputting the image alignment feature, the text encoding feature, and the text alignment feature to a preset noise monitoring unit constructed based on the preset self-attention mechanism and a preset cross-attention mechanism to perform processing, to extract a difference signal between the target image and the target text; and generating a difference description statement based on the difference signal by using a preset difference description generation algorithm.

According to a second aspect, the present application discloses a difference description statement generation apparatus, including:

a feature concatenation module, configured to encode a target image and target text respectively, and perform feature concatenation on an image encoding feature and a text encoding feature that are obtained by encoding, to obtain a concatenated encoding feature;

an image-text alignment module, configured to input the concatenated encoding feature to a preset image-text alignment unit constructed based on a preset self-attention mechanism to perform image-text alignment processing, to obtain a concatenated alignment feature;

a noise monitoring module, configured to split the concatenated alignment feature to obtain an image alignment feature and a text alignment feature, and input the image alignment feature, the text encoding feature, and the text alignment feature to a preset noise monitoring unit constructed based on the preset self-attention mechanism and a preset cross-attention mechanism to perform processing, to extract a difference signal between the target image and the target text; and a difference description statement generation module, configured to generate a difference description statement based on the difference signal by using a preset difference description generation algorithm.

According to a third aspect, the present application discloses an electronic device, including a memory and one or more processors. The memory stores computer-readable instructions. The computer-readable instructions, when executed by the one or more processors, cause the one or more processors to perform the difference description statement generation method disclosed above.

According to a fourth aspect, the present application discloses one or more non-volatile computer-readable storage medium storing computer-readable instructions. The computer-readable instructions, when executed by one or more processors, cause the one or more processors to perform the difference description statement generation method disclosed above.

Details of one or more embodiments of the present application will be proposed in the following accompanying drawings and descriptions. Other features and advantages of the present application will become apparent in the specification, the accompanying drawings, and the claims.

BRIEF DESCRIPTION OF THE DRAWINGS

To describe the technical solutions in embodiments of the present application or the prior art more clearly, the following briefly describes the accompanying drawings required for describing the embodiments or the prior art. It is clear that the accompanying drawings in the following description show merely the embodiments of the present application, and a person of ordinary skill in the art may still derive other drawings from the provided accompanying drawings without creative efforts.

DETAILED DESCRIPTION

The following clearly and completely describes the technical solutions in the embodiments of the present application with reference to the accompanying drawings in the embodiments of the present application. It is clear that the described embodiments are merely some but not all of the embodiments of the present application. All other embodiments obtained by a person of ordinary skill in the art based on the embodiments of the present application without creative efforts shall fall within the protection scope of the present application.

In the field of multi-modality, a human language error may make a computer model confuse a problem that a person really wants to describe, and as a result, a computer cannot perform normal reasoning.

To this end, the embodiments of the present application propose a difference description statement generation solution, to solve the problem that the computer cannot perform normal reasoning due to the human language error and further enhance human-computer interaction experience.

Figure 1:
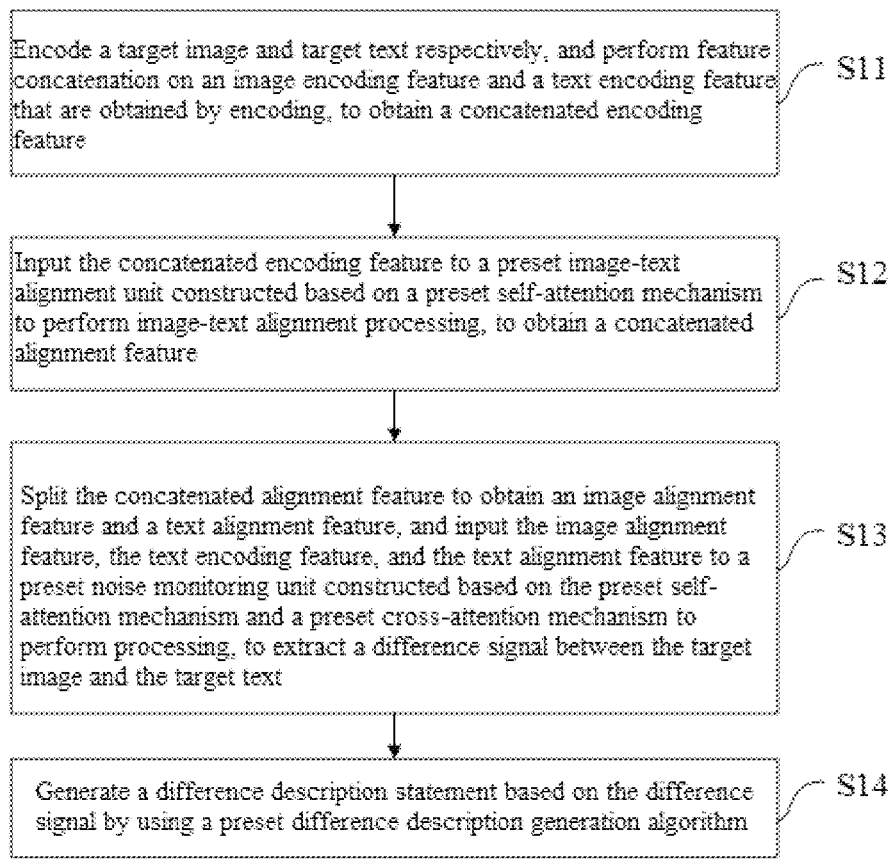
FIG. 1 is a flowchart of a difference description statement generation method according to one or more embodiments of the present application.

An embodiment of the present application discloses a difference description statement generation method. As shown in FIG. 1, the method is described as applied to a computer device for illustration. The method includes the following steps.

Step S11: Encoding a target image and target text respectively, and performing feature concatenation on an image encoding feature and a text encoding feature that are obtained by encoding, to obtain a concatenated encoding feature.

It should be noted that an image encoder for encoding the target image may be a residual neural network (ResNet), ResNeXt, or the like, and an image encoder for encoding the target text may be robustly optimized bidirectional encoder representation from transformers (BERT) pretraining approach (RoBERTa), BERT, or the like. After the image encoding feature and the text encoding feature are obtained, feature concatenation needs to be performed on the image encoding feature and the text encoding feature based on a preset ratio to obtain a concatenated encoding feature.

Step S12: Inputting the concatenated encoding feature to a preset image-text alignment unit constructed based on a preset self-attention mechanism to perform image-text alignment processing, to obtain a concatenated alignment feature.

In some embodiments, before inputting the concatenated encoding feature to a preset image-text alignment unit constructed based on a preset self-attention mechanism to perform image-text alignment processing, the method further includes: constructing an image-text alignment subunit based on a self-attention operation unit, a layer normalization unit, and a feature addition unit; and connecting a first preset quantity of image-text alignment subunits in series sequentially to construct the preset image-text alignment unit. Therefore, the step of inputting the concatenated encoding feature to a preset image-text alignment unit constructed based on a preset self-attention mechanism to perform image-text alignment processing includes: determining a first image-text alignment subunit in the preset image-text alignment unit as a current image-text alignment subunit, and determining the concatenated encoding feature as a feature to be processed; inputting the feature to be processed to the current image-text alignment subunit; performing a self-attention operation, a layer normalization operation, and a feature addition operation sequentially on the feature to be processed by using the current image-text alignment subunit, to obtain a corresponding current operation processing result; determining whether the current image-text alignment subunit is a last image-text alignment subunit; and if the current image-text alignment subunit is not the last image-text alignment subunit, updating the current image-text alignment subunit to a next image-text alignment subunit, updating the feature to be processed to the current operation processing result, and performing the step of inputting the feature to be processed to the current image-text alignment subunit; or if the current image-text alignment subunit is the last image-text alignment subunit, determining the current operation processing result as the concatenated alignment feature.

It should be noted that the performing a self-attention operation, a layer normalization operation, and a feature addition operation sequentially on the feature to be processed by using the current image-text alignment subunit may include: performing the self-attention operation on the feature to be processed by using a self-attention operation unit in the current image-text alignment subunit, to obtain a first operation feature; performing layer normalization processing on the first operation feature by using a layer normalization unit in the current image-text alignment subunit, to obtain a second operation feature; and performing the feature addition operation on the second operation feature and the feature to be processed by using a feature addition unit in the current image-text alignment subunit, to obtain the current operation processing result.

In some embodiments, a matching relationship between an image and a text may be learned by using the preset image-text alignment unit, whereby parts in which image and text features cannot be aligned are error parts. Based on this, parts that do not conform to facts in human language can be located.

Step S13: Splitting the concatenated alignment feature to obtain an image alignment feature and a text alignment feature, and inputting the image alignment feature, the text encoding feature, and the text alignment feature to a preset noise monitoring unit constructed based on the preset self-attention mechanism and a preset cross-attention mechanism to perform processing, to extract a difference signal between the target image and the target text.

In some embodiments, parts in which images cannot be aligned in human language text are located by using the preset self-attention mechanism and the preset cross-attention mechanism in the preset noise monitoring unit, whereby the difference between the target image and the target text can be obtained.

In some embodiments, before splitting the concatenated alignment feature to obtain an image alignment feature and a text alignment feature, and inputting to a preset noise monitoring unit constructed based on the preset self-attention mechanism and a preset cross-attention mechanism to perform processing, the method further includes: constructing a noise monitoring subunit based on a self-attention operation unit, a layer normalization unit, a feature addition unit, a cross-attention operation unit, and an attention superposition unit; and connecting a second preset quantity of noise monitoring subunits in series sequentially to construct the preset noise monitoring unit.

Step S14: Generating a difference description statement based on the difference signal by using a preset difference description generation algorithm.

In some embodiments, after the difference signal is obtained, the difference description statement is generated based on the difference signal by using the preset difference description generation algorithm, wherein the difference description statement is an explanatory description statement that a computer can give when there is a human language error.

It can be learned that the present application proposes the difference description statement generation method, including: encoding the target image and the target text respectively, and performing feature concatenation on the image encoding feature and the text encoding feature that are obtained by encoding, to obtain the concatenated encoding feature; inputting the concatenated encoding feature to the preset image-text alignment unit constructed based on the preset self-attention mechanism to perform image-text alignment processing, to obtain the concatenated alignment feature; splitting the concatenated alignment feature to obtain the image alignment feature and the text alignment feature, and inputting the image alignment feature, the text encoding feature, and the text alignment feature to the preset noise monitoring unit constructed based on the preset self-attention mechanism and the preset cross-attention mechanism to perform processing, to extract the difference signal between the target image and the target text; and generating the difference description statement based on the difference signal by using the preset difference description generation algorithm. It can be learned that in the present application, image-text difference noise monitoring is performed based on the preset self-attention mechanism and the preset cross-attention mechanism. Due to a characteristic of an attention mechanism that the attention mechanism can extract key information from a complex feature, a difference between an image and text can be effectively monitored when image-text difference noise monitoring is performed based on the attention mechanism, improving accuracy of a monitored image-text difference noise. Then, corresponding explanatory description is performed on the image-text difference noise, to prompt in time a user for whom error language text is generated. In summary, it can be learned that with the foregoing technical solution of the present application, a normal reasoning function of the computer can be ensured in a case of the error language text, and human-computer interaction experience is enhanced.

Figure 2:
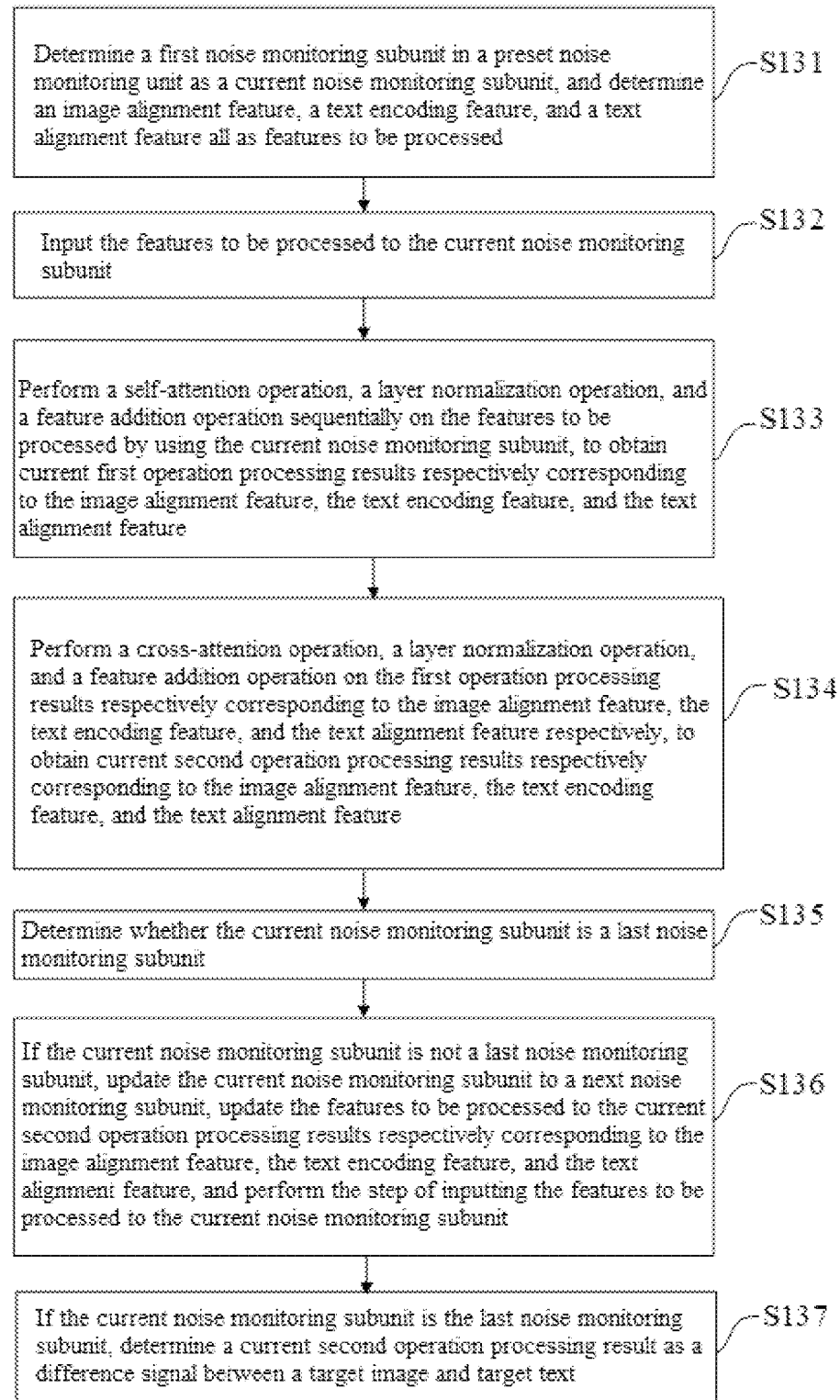
FIG. 2 is a sub-flowchart of a difference description statement generation method according to one or more embodiments of the present application.

Further, a process of extracting the difference signal between the target image and the target text based on the preset noise monitoring unit constructed based on the preset self-attention mechanism and the preset cross-attention mechanism in step S13 in the foregoing embodiment is described in detail in this embodiment. As shown in FIG. 2, step S13 includes the following steps.

Step S131: Determining a first noise monitoring subunit in the preset noise monitoring unit as a current noise monitoring subunit, and determining the image alignment feature, the text encoding feature, and the text alignment feature all as features to be processed.

Step S132: Inputting the features to be processed to the current noise monitoring subunit.

Step S133: Performing a self-attention operation, a layer normalization operation, and a feature addition operation sequentially on the features to be processed by using the current noise monitoring subunit, to obtain current first operation processing results respectively corresponding to the image alignment feature, the text encoding feature, and the text alignment feature.

Step S134: Performing a cross-attention operation, a layer normalization operation, and a feature addition operation on the first operation processing results respectively corresponding to the image alignment feature, the text encoding feature, and the text alignment feature respectively, to obtain current second operation processing results respectively corresponding to the image alignment feature, the text encoding feature, and the text alignment feature.

It should be noted that in this embodiment, a process of performing the cross-attention operation, the layer normalization operation, and the feature addition operation on the first operation processing result corresponding to the text encoding feature respectively includes: performing the cross-attention operation on the first operation processing result corresponding to the text encoding feature to obtain a corresponding cross-attention operation result, wherein the cross-attention operation includes a cross-attention operation between the first operation processing result corresponding to the text encoding feature and each of the first operation processing result corresponding to the image alignment feature, and the first operation processing result corresponding to the text alignment feature; inputting the cross-attention operation result to an attention superposition unit constructed based on a preset formula to perform a corresponding attention superposition operation, to obtain a corresponding attention superposition operation result; and performing the layer normalization operation and the feature addition operation sequentially on the attention superposition operation result to obtain the corresponding second operation processing result.

The preset formula is:

$$f = \text{attn}_{cross}(f_{align}, g_{raw}) + \text{attn}_{cross}(g_{align}, g_{raw}),$$

wherein f represents the attention superposition operation result, $f_{align}$ represents the image alignment feature, $g_{align}$ represents the text encoding feature, $g_{raw}$ represents the text alignment feature, and $\text{attn}_{cross}$ represents the cross-attention operation.

Step S135: Determining whether the current noise monitoring subunit is a last noise monitoring subunit.

Step S136: If the current noise monitoring subunit is not the last noise monitoring subunit, updating the current noise monitoring subunit to a next noise monitoring subunit, updating the features to be processed to the current second operation processing results respectively corresponding to the image alignment feature, the text encoding feature, and the text alignment feature, and performing the step of inputting the features to be processed to the current noise monitoring subunit.

Step S137: If the current noise monitoring subunit is the last noise monitoring subunit, determining the current second operation processing result as the difference signal between the target image and the target text.

That is, in some embodiments, image-text difference noise monitoring is performed based on the preset self-attention mechanism and the preset cross-attention mechanism. Due to the characteristic of the attention mechanism that the attention mechanism can extract the key information from the complex feature, the difference between the image and the text can be effectively monitored when image-text difference noise monitoring is performed based on the attention mechanism.

Figure 3:
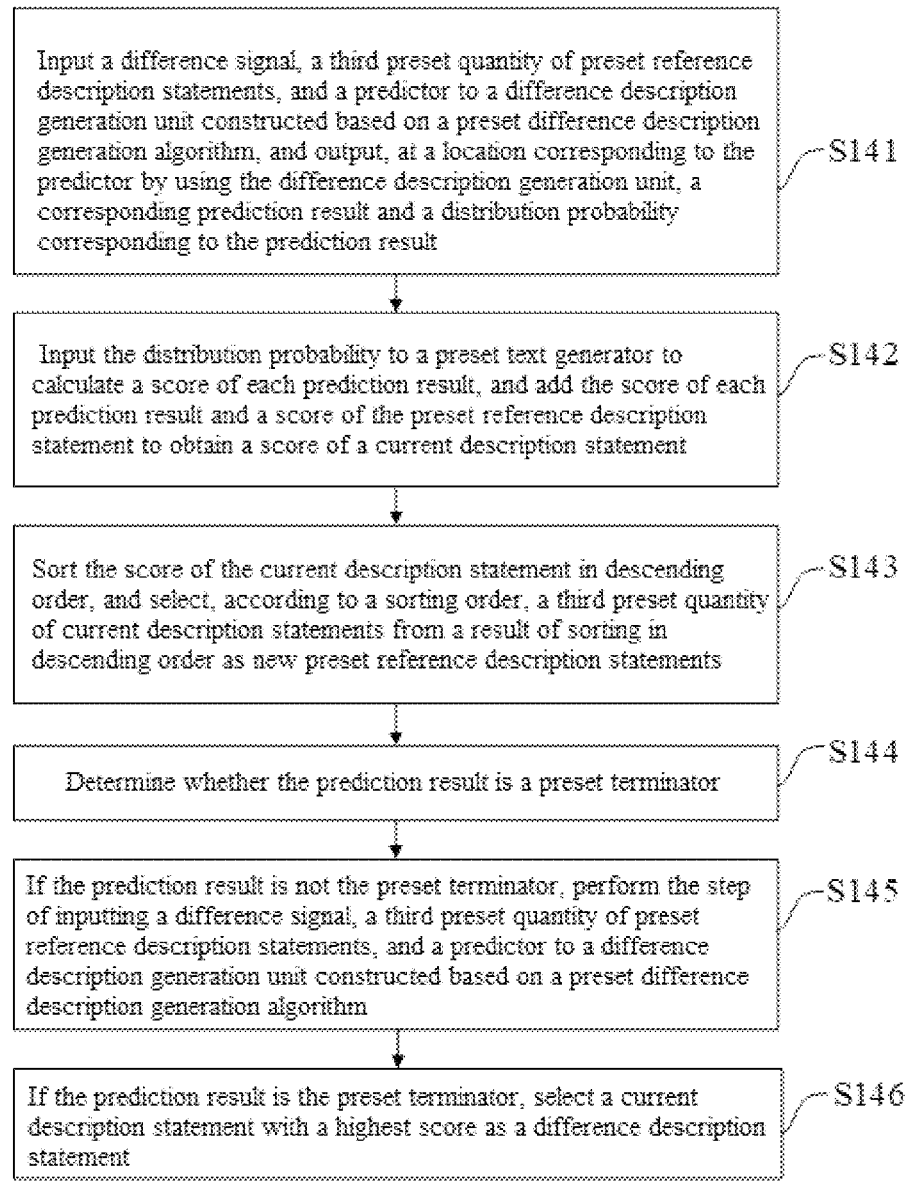
FIG. 3 is a sub-flowchart of a difference description statement generation method according to one or more embodiments of the present application.

Further, a process of generating the difference description statement based on the difference signal by using the preset difference description generation algorithm in step S14 in the foregoing embodiment is described in detail in this embodiment. As shown in FIG. 3, step S14 includes the following steps.

Step S141: Inputting the difference signal, a third preset quantity of preset reference description statements, and a predictor to a difference description generation unit constructed based on the preset difference description generation algorithm, and outputting, at a location corresponding to the predictor by using the difference description generation unit, a corresponding prediction result and a distribution probability corresponding to the prediction result.

Step S142: Inputting the distribution probability to a preset text generator to calculate a score of each prediction result, and adding the score of each prediction result and a score of the preset reference description statement to obtain a score of a current description statement.

Step S143: Sorting the score of the current description statement in descending order, and selecting, according to a sorting order, a third preset quantity of current description statements from a result of sorting in descending order as new preset reference description statements.

Step S144: Determining whether the prediction result is a preset terminator.

Step S145: If the prediction result is not the preset terminator, performing the step of inputting the difference signal, a third preset quantity of preset reference description statements, and a predictor to a difference description generation unit constructed based on the preset difference description generation algorithm.

Step S146: If the prediction result is the preset terminator, selecting a current description statement with a highest score as the difference description statement.

It should be noted that the preset reference description statement includes no content when prediction is performed for the first time by using the difference description generation unit. The preset reference description statement is formed when prediction is cyclically performed over and over again. In addition, in some embodiments, a feature dimensionality remains unchanged, whereby the predictor is set to output the corresponding prediction result at the location corresponding to the predictor.

In addition, there may be a plurality of correct descriptions for a difference. Therefore, in some embodiments, the preset text generator is designed to store intermediate text, and calculate a score of each description statement. Then, the score of each description statement is sorted, and the difference description statement is determined based on the sorting result. In this way, a corresponding explanatory description is given based on the preset difference description generation algorithm, solving the problem that the computer cannot perform normal reasoning due to the human language error.

Figure 4:
FIG. 4 is a schematic diagram of a structure of a conventional VQA sample.
Figure 5:
FIG. 5 is a schematic diagram of a structure of a VQA sample according to one or more embodiments of the present application.

FIG. 4 shows a VQA sample in a case in which human language matches an image. FIG. 5 shows a VQA sample that an explanatory description statement can be given in this embodiment of the present application in a case of a human language error.

In the past two years, due to the wide application of a transformer (a classic NLP model) structure, a transformer-based multi-modal network structure has performed excellently in multi-modal tasks such as VQA, image caption, and a visual dialog. The transformer structure has a gene of text attention (attention mechanism), and thus naturally has a capability of extracting a key point from a complex feature, and this capability makes the transformer structure stand out in the field of multi-modality. In addition, for description of a difference, an attention structure also has a capability of completing locating and explanation of an error in text. Therefore, in the present application, improvements and designs are carried out with the attention mechanism in the transformer structure as an inspiration, to generate a difference description statement. On the other hand, existing multi-modal tasks, such as phrase grounding and referring expression comprehension, all involve related theoretical knowledge of text and image alignment. Based on this, in the present application, a conclusion can be drawn that an image encoding feature and a text encoding feature can be aligned as a cross reference to each other. For a sample in which an image and text cannot completely match, a part in which the image and the text cannot be aligned is an error part. Based on this, it is believed in the present application that with a natural image given, content that does not conform to a fact in human language can be located based on the attention mechanism, and an explanatory description of this difference can also be generated.

Figure 6:
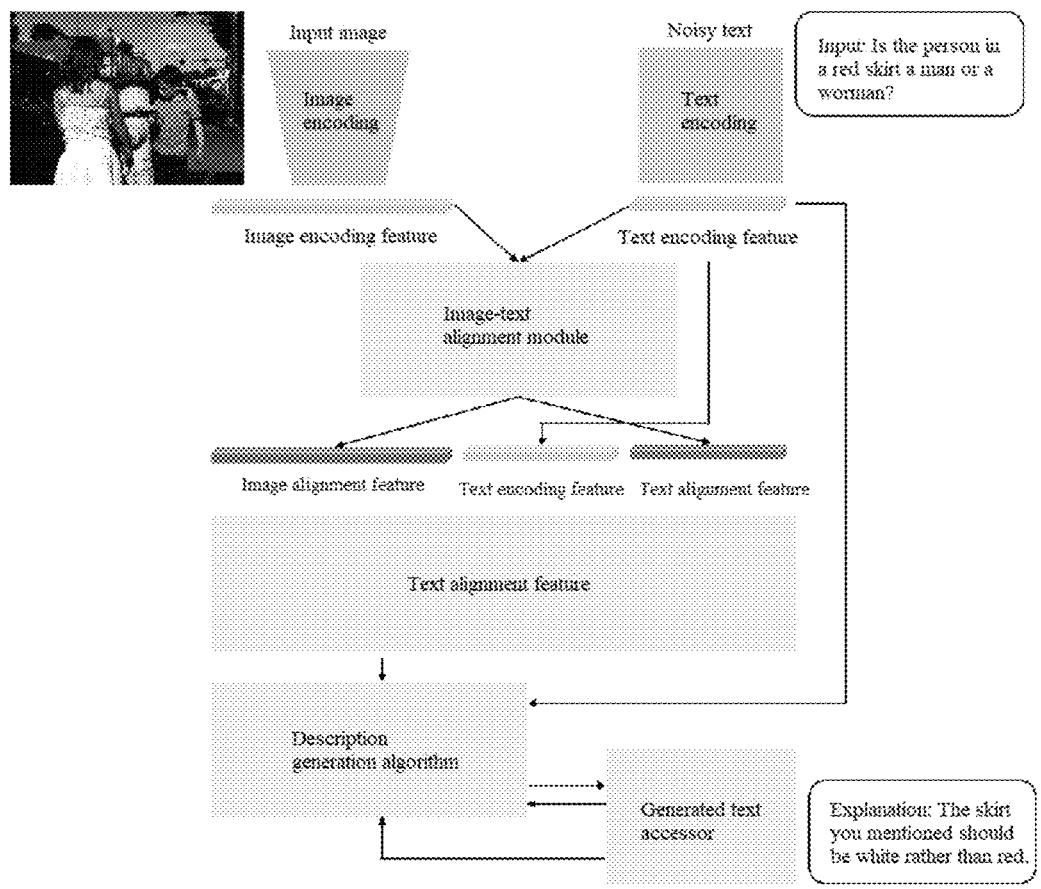
FIG. 6 is a flowchart of a difference description statement generation method according to one or more embodiments of the present application.

The present application discloses a flowchart of the difference description statement generation method. The difference description statement generation method is used to solve the problem that a multi-modal model cannot perform normal reasoning in reality due to a human language error. In addition, the nature of a description generated by the method that the description may be used to communicate with a person is used as an additional function in the present application. As shown in FIG. 6, a process of the difference description statement generation method includes an image and text encoder, an image-text alignment module, a noise monitoring module, a description generation module, and a generated text access device.

Figure 7:
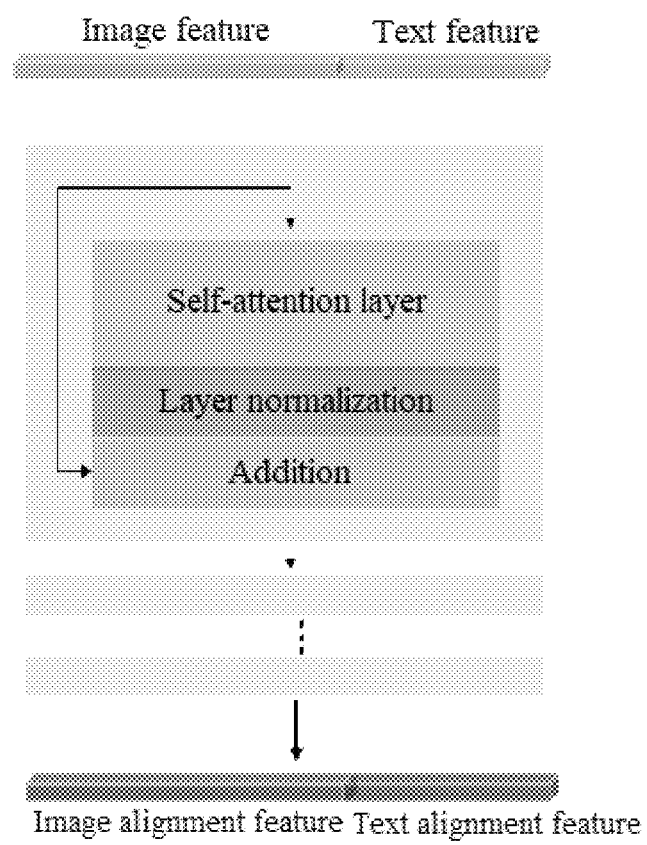
FIG. 7 is a schematic diagram of a structure of an image-text alignment module according to one or more embodiments of the present application.

As shown in FIG. 7, the image-text alignment module involved in the present application first concatenates outputs (an image encoding feature $f_{raw}$ and a text encoding feature $g_{raw}$) of different encoders based on a certain ratio, then inputs a concatenation result to a plurality of image-text alignment submodules for encoding, and finally obtains an image alignment feature and a text alignment feature. In some embodiments, each image-text alignment submodule includes a self-attention layer, a layer normalization layer, and an addition layer. A preset self-attention mechanism is constructed in the self-attention module based on a first preset formula.

The first preset formula is:

$$attn_{self}(f) = soft\max\left(\frac{(W_q \cdot f)^T \times (W_k \cdot f)}{\sqrt{size(f)}}\right) \times (W_v \cdot f),$$

wherein f represents an input of each self-attention operation unit, $W_q$, $W_k$, and $W_v$ represent mapping matrices, $$soft\max(x) = \frac{e^x}{\sum_{j=1}^{n} e^x},$$

and size(f) represents a dimensionality.

Figure 8:
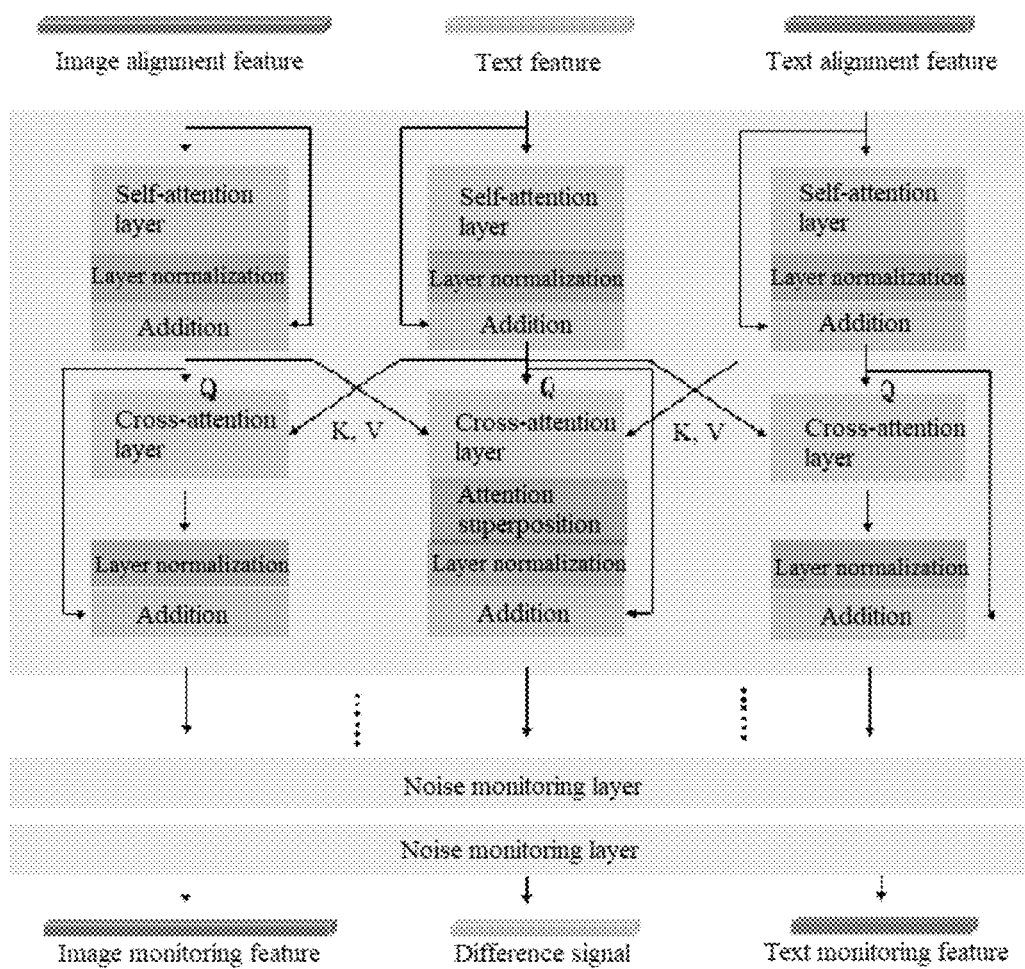
FIG. 8 is a schematic diagram of a structure of a noise monitoring module according to one or more embodiments of the present application.

As shown in FIG. 8, the noise monitoring module involved in the present application splits the features output by the image-text alignment module based on the ratio for concatenation, and inputs the image alignment feature obtained by splitting, the text encoding feature, and the text alignment feature to a plurality of noise monitoring submodules to perform encoding, to obtain a difference signal. In some embodiments, each noise monitoring submodule includes a self-attention layer, a layer normalization layer, an addition layer, a cross-attention layer, and an attention superposition layer. It should be noted that when a cross-attention operation is performed in the cross-attention layer, a preset cross-attention mechanism is determined based on a second preset formula, and then the corresponding operation is performed based on the preset cross-attention mechanism.

The second preset formula is:

$$attn_{cross}(f, g) = soft\max\left(\frac{(W_q \cdot f)^T \times (W_k \cdot g)}{\sqrt{size(g)}}\right) \times (W_v \cdot g),$$

wherein f and g respectively represent two input features participating in the cross-attention operation each time in the cross-attention layer, and size(g) represent a dimensionality.

In the present application, the noise monitoring module is designed to determine a difference between an image and text, and the output difference signal carries unmatched elements of the image and the text. For example, for "the dress of the girl is white" (an image) and "the skirt of the girl is red" (text) shown in FIG. 5, the difference signal output by the module may carry information such as "white", "girl", "skirt", "red", and "color".

Figure 9:
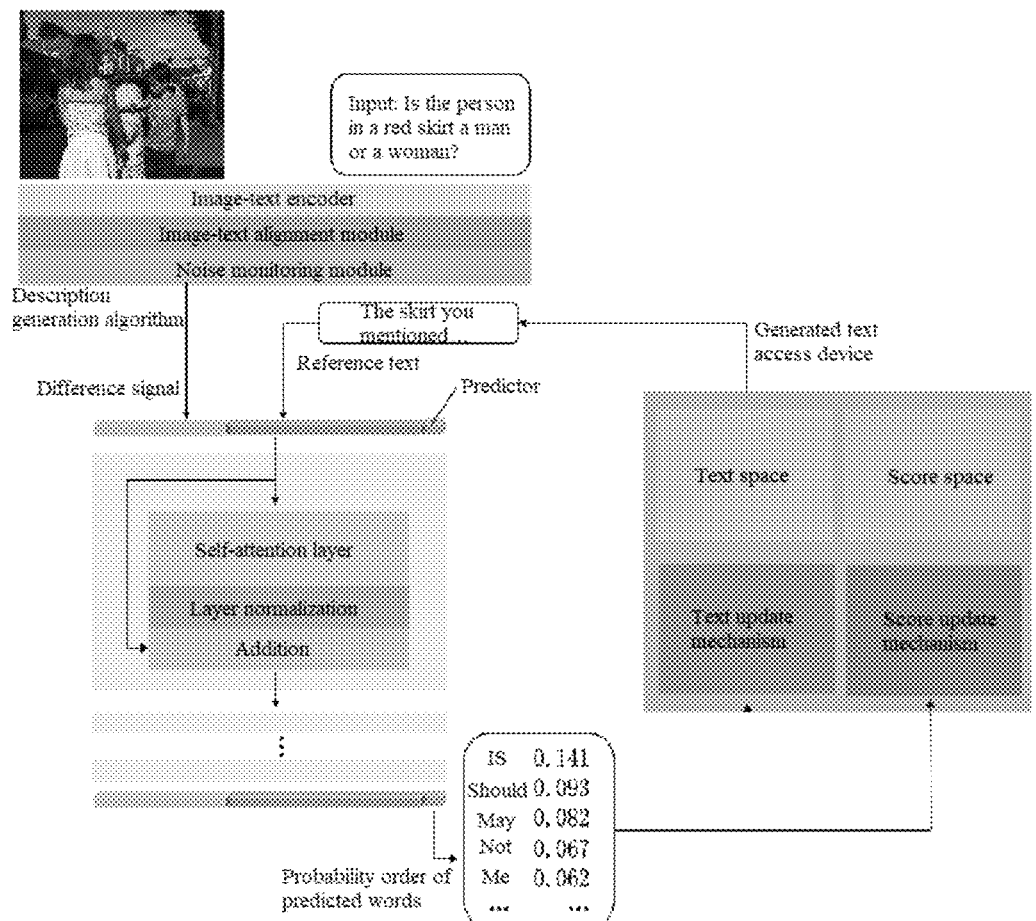
FIG. 9 is a schematic diagram of a structure of a description generation module according to one or more embodiments of the present application.

As shown in FIG. 9, the description generation module involved in the present application includes two parts: a description generation algorithm and the generated text access device. The description generation module includes a plurality of text decoding submodules that are cascaded. Each decoding submodule includes a self-attention layer, a layer normalization layer, and an addition layer. An input of the description generation algorithm is obtained by concatenating three parts of content: the difference signal, a fixed code of reference text, and a fixed code of a predictor. A last feature that is output represents a prediction result at a location corresponding to the predictor, and is a probability distribution indicating what is a next word.

In some embodiments, it should be noted that the generated text access device includes four parts: a text space, configured to store a third preset quantity of current appropriate difference description statements (not required to be complete sentences); a score space, configured to store scores corresponding to the third preset quantity of statements; a text update mechanism, configured to store new text generated by using a preset difference description generation algorithm to the text space, and delete text corresponding to a low score; and a score update mechanism, configured to score updated text, and store a score to the score space.

In an implementation, if the third preset quantity is N, each time when the preset difference description generation algorithm is invoked, N statements are extracted from the "text space" and input in batches to the preset difference description generation algorithm to predict next text, to obtain a probability distribution including N×M words and N×M probabilities. Then, the probability distribution is input to the "text update mechanism" of a preset text generator, scores of the N statements are read from the "score space", N×M scores of current text are added in the "score update mechanism" to obtain total scores, and sorting is performed. Text sorted at the first N places is stored to the "text space". Updated scores of the N pieces of text are stored to the "score space". When a predicted word is a preset terminator, a cycle is ended, and a current description statement with a highest score is selected as the difference description statement.

Figure 10:
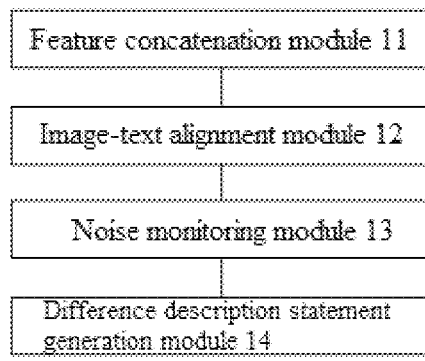
FIG. 10 is a schematic diagram of a structure of a difference description statement generation apparatus according to one or more embodiments of the present application.

Correspondingly, an embodiment of the present application further discloses a difference description statement generation apparatus. As shown in FIG. 10, the apparatus includes:

a feature concatenation module 11, configured to encode a target image and target text respectively, and perform feature concatenation on an image encoding feature and a text encoding feature that are obtained by encoding, to obtain a concatenated encoding feature;

an image-text alignment module 12, configured to input the concatenated encoding feature to a preset image-text alignment unit constructed based on a preset self-attention mechanism to perform image-text alignment processing, to obtain a concatenated alignment feature;

a noise monitoring module 13, configured to split the concatenated alignment feature to obtain an image alignment feature and a text alignment feature, and input the image alignment feature, the text encoding feature, and the text alignment feature to a preset noise monitoring unit constructed based on the preset self-attention mechanism and a preset cross-attention mechanism to perform processing, to extract a difference signal between the target image and the target text; and a difference description statement generation module 14, configured to generate a difference description statement based on the difference signal by using a preset difference description generation algorithm.

A more concrete operating process of each module refers to the corresponding content disclosed in the foregoing embodiment. Details are not described herein again.

It can be learned that the present application proposes a difference description statement generation method, including: encoding a target image and target text respectively, and performing feature concatenation on an image encoding feature and a text encoding feature that are obtained by encoding, to obtain a concatenated encoding feature; inputting the concatenated encoding feature to a preset image-text alignment unit constructed based on a preset self-attention mechanism to perform image-text alignment processing, to obtain a concatenated alignment feature; splitting the concatenated alignment feature to obtain an image alignment feature and a text alignment feature, and inputting the image alignment feature, the text encoding feature, and the text alignment feature to a preset noise monitoring unit constructed based on the preset self-attention mechanism and a preset cross-attention mechanism to perform processing, to extract a difference signal between the target image and the target text; and generating a difference description statement based on the difference signal by using a preset difference description generation algorithm. It can be learned that in the present application, image-text difference noise monitoring is performed based on the preset self-attention mechanism and the preset cross-attention mechanism. Due to a characteristic of an attention mechanism that the attention mechanism can extract key information from a complex feature, a difference between an image and text can be effectively monitored when image-text difference noise monitoring is performed based on the attention mechanism, improving accuracy of a monitored image-text difference noise. Then, corresponding explanatory description is performed on the image-text difference noise, to prompt in time a user for whom error language text is generated. In summary, it can be learned that with the foregoing technical solution of the present application, a normal reasoning function of a computer can be ensured in a case of the error language text, and human-computer interaction experience is enhanced.

Figure 11:
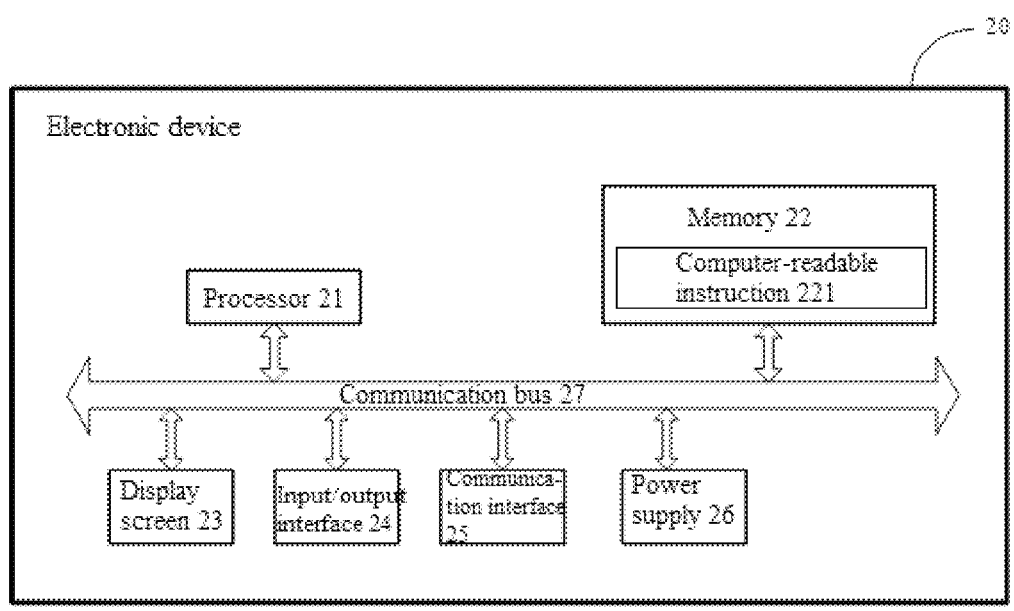
FIG. 11 is a diagram of a structure of an electronic device according to the present application.

Further, an embodiment of the present application further provides an electronic device. FIG. 11 is a diagram of a structure of an electronic device 20 according to an exemplary embodiment. The content in the figure cannot be considered as any limitation on the scope of use of the present application.

FIG. 11 is a schematic diagram of the structure of the electronic device 20 according to an embodiment of the present application. The electronic device may be a computer device. The computer device may be a terminal or a server. The electronic device 20 may include at least one processor 21, at least one memory 22, a display screen 23, an input/output interface 24, a communication interface 25, a power supply 26, and a communication bus 27. The memory 22 is configured to store computer-readable instructions. The computer-readable instructions are loaded and executed by the processor 21, to implement the related steps in the difference description statement generation method disclosed in any one of the foregoing embodiments. In addition, the electronic device 20 in this embodiments may be an electronic computer.

In some embodiments, the power supply 26 is configured to provide an operating voltage for each hardware device of the electronic device 20. The communication interface 25 can create a data transmission channel between the electronic device 20 and an external device, wherein a communication protocol that the communication interface 25 complies with is any communication protocol applicable to the technical solution of the present application, and is not limited herein. The input/output interface 24 is configured to obtain input data from the outside or output data to the outside, wherein a interface type of the input/output interface 24 may be selected based on a application requirement, and is not limited herein.

In addition, as a carrier for resource storage, the memory 22 may be a read-only memory (ROM), a random access memory (RAM), a disk, an optical disc, or the like, a resource stored on the memory 22 may include a computer-readable instruction 221, and a storage manner may be temporary storage or permanent storage. The computer-readable instruction 221 includes a computer-readable instruction used to complete the difference description statement generation method that is disclosed in any one of the foregoing embodiments and that is performed by the electronic device 20, and may further include a computer-readable instruction used to complete other work.

Further, an embodiment of the present application further discloses a non-volatile computer-readable storage medium. The non-volatile computer-readable storage medium stores computer-readable instructions. When the computer-readable instructions are executed by one or more processors, the difference description statement generation method disclosed in any one of the foregoing embodiments may be implemented.

Steps of the method refer to the corresponding content disclosed in the foregoing embodiment. Details are not described herein again.

All the embodiments in this specification are described in a progressive manner. Each embodiment focuses on a difference from another embodiment. For a same or similar part between different embodiments, reference may be made between the embodiments. In other words, an apparatus disclosed in the embodiments corresponds to the method disclosed in the embodiments, and thus is described briefly, and for a related part, reference is made to the description of the method part.

A person skilled in the art may be further aware that the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The steps of the method or algorithm described with reference to the embodiments disclosed in this specification may be directly implemented by hardware, a software module executed by a processor, or a combination thereof. The software module may reside in a RAM, a memory, a ROM, an electrically programmable ROM (PROM), an electrically erasable programmable ROM (EEPROM), a register, a hard disk, a removable disk, a compact disc read-only memory (CD-ROM), or any other form of storage medium known in the art.

Finally, it should be noted that in this specification, relational terms such as first and second are used only to differentiate an entity or operation from another entity or operation, and do not necessarily require or imply that any actual relationship or sequence exists between these entities or operations. Moreover, the terms "include" and "contain", or any of their variants is intended to cover a non-exclusive inclusion, whereby a process, method, article, or device that includes a list of elements not only includes those elements but also includes other elements that are not expressly listed, or further includes elements inherent to such process, method, article, or device. In absence of more constraints, an element preceded by "includes a . . . " does not preclude the existence of other identical elements in the process, method, article, or device that includes the element.

A person of ordinary skill in the art may understand that all or some of the processes of the method in the foregoing embodiments may be implemented by computer-readable instructions instructing related hardware. The computer-readable instructions may be stored in a non-volatile computer-readable storage medium. When the computer-readable instructions are run, the processes of the method in the foregoing embodiments are performed. Any memory, storage, database, or other medium used by reference in each embodiment provided in the present application may include non-volatile and/or volatile memories. The non-volatile memory may include a ROM, a PROM, an electrically PROM (EPROM), an EEPROM, or a flash memory. The volatile memory may include a RAM or an external cache. Illustratively rather than restrictively, the RAM may be obtained in various forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct RDRAM (DRDRAM), and a rambus dynamic RAM (RDRAM).

Technical features in the foregoing embodiments may be freely combined. For brevity of description, not all possible combinations of the technical features in the foregoing embodiments are described. However, combinations of these technical features shall be considered as falling within the scope recorded in this specification provided that no conflict exists.

The foregoing embodiments only describe several implementations of the present application, and are described in detail but not thus understood as limitations on the patent scope of the present application. It should be noted that a person of ordinary skill in the art may further make a plurality of transformations and improvements without departing from the concept of the present application, and the transformations and improvements shall fall within the protection scope of the present application. Therefore, the patent protection scope of the present application shall be subject to the appended claims.

What is claimed is:

1. A difference description statement generation method, comprising:
    encoding a target image and target text respectively, and performing feature concatenation on an image encoding feature and a text encoding feature that are obtained by encoding, to obtain a concatenated encoding feature;
    inputting the concatenated encoding feature to a preset image-text alignment unit constructed based on a preset self-attention mechanism to perform image-text alignment processing, to obtain a concatenated alignment feature;
    splitting the concatenated alignment feature to obtain an image alignment feature and a text alignment feature, and inputting the image alignment feature, the text encoding feature, and the text alignment feature to a preset noise monitoring unit constructed based on the preset self-attention mechanism and a preset cross-attention mechanism to perform processing, to extract a difference signal between the target image and the target text; and
    generating a difference description statement based on the difference signal by using a preset difference description generation algorithm.

2. The difference description statement generation method according to claim 1, wherein the encoding the target image and the target text respectively comprises:
    encoding the target image and the target text by using an image encoder.

3. The difference description statement generation method according to claim 2, wherein the image encoder for encoding the target image is a residual neural network (ResNet) or a deep neural network ResNeXt.

4. The difference description statement generation method according to claim 2, wherein the image encoder for encoding the target text is robustly optimized bidirectional encoder representation from transformers (BERT) pretraining approach (RoBERTa) or BERT.

5. The difference description statement generation method according to claim 1, wherein before the inputting the concatenated encoding feature to the preset image-text alignment unit constructed based on the preset self-attention mechanism to perform image-text alignment processing, the method further comprises:
    constructing an image-text alignment subunit based on a self-attention operation unit, a layer normalization unit, and a feature addition unit; and
    connecting a first preset quantity of image-text alignment subunits in series to construct the preset image-text alignment unit.

6. The difference description statement generation method according to claim 5, wherein the inputting the concatenated encoding feature to the preset image-text alignment unit constructed based on the preset self-attention mechanism to perform image-text alignment processing comprises:
    determining a first image-text alignment subunit in the preset image-text alignment unit as a current image-text alignment subunit, and determining the concatenated encoding feature as a feature to be processed;
    inputting the feature to be processed to the current image-text alignment subunit;
    performing a self-attention operation, a layer normalization operation, and a feature addition operation sequentially on the feature to be processed by using the current image-text alignment subunit, to obtain a corresponding current operation processing result; and
    in response to the current image-text alignment subunit being not a last image-text alignment subunit, updating the current image-text alignment subunit to a next image-text alignment subunit, updating the feature to be processed to the current operation processing result, and performing the inputting the feature to be processed to the current image-text alignment subunit.

7. The difference description statement generation method according to claim 6, further comprising:
    in response to the current image-text alignment subunit being the last image-text alignment subunit, determining the current operation processing result as the concatenated alignment feature.

8. The difference description statement generation method according to claim 6, wherein the performing the self-attention operation, the layer normalization operation, and the feature addition operation sequentially on the feature to be processed by using the current image-text alignment subunit comprises:
    performing the self-attention operation on the feature to be processed by using a self-attention operation unit in the current image-text alignment subunit, to obtain a first operation feature;
    performing layer normalization processing on the first operation feature by using a layer normalization unit in the current image-text alignment subunit, to obtain a second operation feature; and performing the feature addition operation on the second operation feature and the feature to be processed by using a feature addition unit in the current image-text alignment subunit, to obtain the current operation processing result.

9. The difference description statement generation method according to claim 1, wherein before the splitting the concatenated alignment feature to obtain the image alignment feature and the text alignment feature, and inputting to the preset noise monitoring unit constructed based on the preset self-attention mechanism and the preset cross-attention mechanism to perform processing, the method further comprises:

constructing a noise monitoring subunit based on a self-attention operation unit, a layer normalization unit, a feature addition unit, a cross-attention operation unit, and an attention superposition unit; and connecting a second preset quantity of noise monitoring subunits in series to construct the preset noise monitoring unit.

10. The difference description statement generation method according to claim 9, wherein the splitting the concatenated alignment feature to obtain the image alignment feature and the text alignment feature, and inputting the image alignment feature, the text encoding feature, and the text alignment feature to the preset noise monitoring unit constructed based on the preset self-attention mechanism and the preset cross-attention mechanism to perform processing, to extract the difference signal between the target image and the target text comprises:

determining a first noise monitoring subunit in the preset noise monitoring unit as a current noise monitoring subunit, and determining the image alignment feature, the text encoding feature, and the text alignment feature all as features to be processed;

inputting the features to be processed to the current noise monitoring subunit;

performing a self-attention operation, a layer normalization operation, and a feature addition operation sequentially on the features to be processed by using the current noise monitoring subunit, to obtain current first operation processing results respectively corresponding to the image alignment feature, the text encoding feature, and the text alignment feature; performing a cross-attention operation, a layer normalization operation, and a feature addition operation on the first operation processing results respectively corresponding to the image alignment feature, the text encoding feature, and the text alignment feature respectively, to obtain current second operation processing results respectively corresponding to the image alignment feature, the text encoding feature, and the text alignment feature; and in response to the current noise monitoring subunit being not a last noise monitoring subunit, updating the current noise monitoring subunit to a next noise monitoring subunit, updating the features to be processed to the current second operation processing results respectively corresponding to the image alignment feature, the text encoding feature, and the text alignment feature, and performing the inputting the features to be processed to the current noise monitoring subunit.

11. The difference description statement generation method according to claim 10, further comprising:

in response to the current noise monitoring subunit being the last noise monitoring subunit, determining the current second operation processing result as the difference signal between the target image and the target text.

12. The difference description statement generation method according to claim 10, wherein the process of performing the cross-attention operation, the layer normalization operation, and the feature addition operation on the first operation processing result corresponding to the text encoding feature respectively comprises:

performing the cross-attention operation on the first operation processing result corresponding to the text encoding feature to obtain a corresponding cross-attention operation result; inputting the cross-attention operation result to an attention superposition unit constructed based on a preset formula to perform a corresponding attention superposition operation, to obtain a corresponding attention superposition operation result; and performing the layer normalization operation and the feature addition operation sequentially on the attention superposition operation result to obtain the corresponding second operation processing result.

13. The difference description statement generation method according to claim 12, wherein the cross-attention operation comprises a cross-attention operation between the first operation processing result corresponding to the text encoding feature, and each of the first operation processing result corresponding to the image alignment feature, and the first operation processing result corresponding to the text alignment feature.

14. The difference description statement generation method according to claim 12, wherein the preset formula is:

$$f = \text{attn}_{cross}(f_{align}, g_{raw}) + \text{attn}_{cross}(g_{align}, g_{raw}),$$

wherein f represents the attention superposition operation result, $f_{align}$ represents the image alignment feature, $g_{align}$ represents the text encoding feature, $g_{raw}$ represents the text alignment feature, and $\text{attn}_{cross}$ represents the cross-attention operation.

15. The difference description statement generation method according to claim 1, wherein the generating the difference description statement based on the difference signal by using the preset difference description generation algorithm comprises:

inputting the difference signal, a third preset quantity of preset reference description statements, and a predictor to a difference description generation unit constructed based on the preset difference description generation algorithm, and outputting, at a location corresponding to the predictor by using the difference description generation unit, a corresponding prediction result and a distribution probability corresponding to the prediction result;

inputting the distribution probability to a preset text generator to calculate a score of each prediction result, and adding the score of each prediction result and a score of the preset reference description statement to obtain a score of a current description statement;

sorting the score of the current description statement in descending order, and selecting, according to a sorting order, a third preset quantity of current description statements from a result of sorting in descending order as new preset reference description statements; and in response to the prediction result being not a preset terminator, performing the inputting the difference signal, the third preset quantity of preset reference description statements, and the predictor to the difference description generation unit constructed based on the preset difference description generation algorithm.

16. The difference description statement generation method according to claim 15, further comprising:

in response to the prediction result being the preset terminator, selecting a current description statement with a highest score as the difference description statement.

17. An electronic device, comprising:

a memory storing computer-readable instructions; and one or more processors configure to execute the computer-readable instructions, wherein upon execution of the computer-readable instructions, the one or more processors is configured to:

encode a target image and target text respectively, and perform feature concatenation on an image encoding feature and a text encoding feature that are obtained by encoding, to obtain a concatenated encoding feature;

input the concatenated encoding feature to a preset image-text alignment unit constructed based on a preset self-attention mechanism to perform image-text alignment processing, to obtain a concatenated alignment feature;

split the concatenated alignment feature to obtain an image alignment feature and a text alignment feature, and input the image alignment feature, the text encoding feature, and the text alignment feature to a preset noise monitoring unit constructed based on the preset self-attention mechanism and a preset cross-attention mechanism to perform processing, to extract a difference signal between the target image and the target text; and generate a difference description statement based on the difference signal by using a preset difference description generation algorithm.

18. One or more non-volatile computer-readable storage media, storing computer-readable instructions, wherein the computer-readable instructions, upon execution by one or more processors, are configured to cause the one or more processors to:

encode a target image and target text respectively, and perform feature concatenation on an image encoding feature and a text encoding feature that are obtained by encoding, to obtain a concatenated encoding feature;

input the concatenated encoding feature to a preset image-text alignment unit constructed based on a preset self-attention mechanism to perform image-text alignment processing, to obtain a concatenated alignment feature;

split the concatenated alignment feature to obtain an image alignment feature and a text alignment feature, and input the image alignment feature, the text encoding feature, and the text alignment feature to a preset noise monitoring unit constructed based on the preset self-attention mechanism and a preset cross-attention mechanism to perform processing, to extract a difference signal between the target image and the target text; and generate a difference description statement based on the difference signal by using a preset difference description generation algorithm.

19. The difference description statement generation method according to claim 8, wherein a matching relationship between the target image and a text is learned by using the preset image-text alignment unit, so as to locate parts in which image and text features cannot be aligned as error parts.

20. The difference description statement generation method according to claim 15, wherein the preset reference description statement includes no content in response to prediction being performed for the first time by using the difference description generation unit, and the preset reference description statement is formed in response to prediction being cyclically performed over and over again.

* * * * *